(12) United States Patent
Belcastro et al.

(10) Patent No.: US 7,393,313 B2
(45) Date of Patent: *Jul. 1, 2008

(54) HIGH SPEED LASER PERFORATION OF CIGARETTE TIPPING PAPER

(75) Inventors: Marc D. Belcastro, Glen Allen, VA (US); Loren Duvekot, Goochland, VA (US); Kenneth E. Rudolph, Jr., Louisville, KY (US); Marvin G. Thompson, Chesterfield, VA (US)

(73) Assignee: Philip Morris USA Inc., Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/507,664

(22) Filed: Aug. 22, 2006

(65) Prior Publication Data

US 2007/0049476 A1 Mar. 1, 2007

Related U.S. Application Data

(62) Division of application No. 10/649,789, filed on Aug. 28, 2003, now Pat. No. 7,094,193.

(51) Int. Cl.
*B31B 1/14* (2006.01)
*B23K 26/36* (2006.01)
(52) U.S. Cl. .................... 493/63; 219/121.7; 131/281
(58) Field of Classification Search ............. 219/121.6, 219/121.61, 121.7, 121.76, 121.78, 121.83; 493/63; 131/281
See application file for complete search history.

(56) References Cited

U.S. PATENT DOCUMENTS

| | | | |
|---|---|---|---|
| 3,226,527 A | 12/1965 | Harding | |
| 3,965,327 A | 6/1976 | Ehlscheid et al. | |
| 4,049,945 A * | 9/1977 | Ehlscheid et al. | 219/121.67 |
| 4,118,619 A | 10/1978 | McArthur et al. | |
| 4,121,595 A | 10/1978 | Heitmann et al. | |
| 4,265,254 A | 5/1981 | Koch et al. | |
| 4,306,242 A | 12/1981 | Jeffery | |
| 4,378,480 A | 3/1983 | Langhans | |
| 4,404,454 A | 9/1983 | Taylor et al. | |
| 4,720,619 A | 1/1988 | Mattei et al. | |
| 5,210,390 A | 5/1993 | Okumoto | |
| 5,259,401 A | 11/1993 | Lange et al. | |
| 5,341,824 A | 8/1994 | Fletcher et al. | |
| 5,363,217 A * | 11/1994 | Keightley | 358/506 |
| 5,367,144 A | 11/1994 | Matsumura et al. | |

(Continued)

Primary Examiner—Hemant M Desai
(74) Attorney, Agent, or Firm—Buchanan Ingersoll & Rooney P.C.

(57) ABSTRACT

A system and method for controlling a cigarette tipping paper perforation process includes supplying the paper in the form of a flexible web from a supply spindle that is mounted for powered angular rotation to a take-up spindle that receives a portion of the flexible web, and the take-up spindle also being mounted for powered angular rotation. A laser beam generator provides at least one laser beam through a series of optics that can include a laser beam expander or contractor, a rotating multi-faceted mirror, collimating lenses and downstream focusing lenses that focus the plurality of laser output beams received from the rotating multi-faceted mirror to burn a plurality of holes in the flexible web of cigarette paper. A control device controls the angular rotation of the supply spindle, the angular rotation of the take-up spindle, tension of the web, laser power and rotation of the multi-faceted mirror.

10 Claims, 8 Drawing Sheets

U.S. PATENT DOCUMENTS

| | | |
|---|---|---|
| 5,403,990 A | 4/1995 | Fukuchi |
| 5,684,617 A | 11/1997 | Langhans |
| 5,774,248 A | 6/1998 | Komatsu |
| 5,944,278 A | 8/1999 | Stevens, III et al. |
| 6,049,057 A | 4/2000 | Imai et al. |
| 6,147,319 A | 11/2000 | Imai et al. |
| 6,191,382 B1 | 2/2001 | Damikolas |
| 6,323,889 B1 | 11/2001 | Miura |
| 6,325,068 B1 | 12/2001 | Dombek et al. |
| 6,600,152 B2 | 7/2003 | Paul |
| 6,653,593 B2 | 11/2003 | Lizotte et al. |
| 2005/0087295 A1 | 4/2005 | Paul et al. |

* cited by examiner

HIGH SPEED LASER PERFORATION OF CIGARETTE TIPPING PAPER

CROSS-REFERENCE TO RELATED APPLICATIONS

This application is a divisional application of U.S. application Ser. No. 10/649,789 entitled HIGH SPEED LASER PERFORATION OF CIGARETTE TIPPING PAPER, filed on Aug. 28, 2003, now U.S. Pat. No. 7,094,193, issued on Aug. 22, 2006, the entire content of which is hereby incorporated by reference.

FIELD OF INVENTION

This invention relates to high speed laser perforation of paper used in making cigarettes.

BACKGROUND

During cigarette manufacturing, long rolls of paper provided on spools or bobbins are used and processed to form the cigarettes. The cigarettes use substantial amounts of the paper as a wrapper, to enclose filter tow material as filters, and to tip filters onto columns of wrapped tobacco. The various manufacturing functions that are performed to the paper can include perforation, either mechanically or by thermal energy transfer (e.g. focused laser energy), printing, embossing, slitting, or other comparable functions on the paper or other flexible webs of material. The following patents are directed to various aspects of these manufacturing functions, and are hereby incorporated in their entireties by reference. U.S. Pat. Nos. 3,226,527; 3,965,327; 4,121,595; 4,265,254; 4,404,454; 5,210,390; 5,259,401; 5,341,824; and 5,367,144.

In performing manufacturing functions such as perforation of the paper used in making the cigarettes, the rolls of paper are generally unwound from bobbins or spindles of the paper, the perforation process is performed upon the paper, and a new bobbin or spindle is formed by winding the processed paper on a new, hollow bobbin core. The paper is unwound from one bobbin, processed by undergoing various operations such as perforation, and then rewound onto another bobbin at very high rates of speed. The very high rates of speed at which paper is processed, up to 1525 meters per minute or 5000 feet per minute during these manufacturing operations, requires the use of high speed analog and digital controls that can synchronize the movement of the paper with operations such as laser perforation that are being performed on the moving paper. U.S. Pat. No. 5,944,278, which is incorporated herein by reference, discloses a method and apparatus for reducing the amount of waste that can result during the startup of a web of paper in high-speed manufacturing processes which involve laser perforation or other processes.

SUMMARY

A system and method for controlling a perforation process according to an embodiment of the invention processes paper or other suitable flexible web material from a supply bobbin or spindle of the flexible web material, such as cigarette tipping paper used in manufacturing cigarettes. The supply spindle is mounted for powered angular rotation. A take-up bobbin or spindle for receiving a portion of the flexible web from the supply spindle is also mounted for powered angular rotation. A laser beam generator is provided, with the laser beam generator being adapted to produce one or more laser beams. At least one multi-faceted mirror or multiplexer mirror is positioned in the path of a laser beam emitted from the laser beam generator, with the multi-faceted mirror being driven to rotate, thereby dividing the laser beam into a plurality of output beams that are scanned across additional downstream optics and focused by focusing lenses to burn a plurality of holes in the paper or other flexible web material. A control device controls the angular rotation of the supply spindle and the take-up spindle, the drive unit that rotates the multi-faceted mirror and the power supplied to the laser beam generator in response to sensor input and control output.

According to an embodiment of the invention, control of the laser beam used in perforating the paper is achieved with a number of components including a plurality of shutter assemblies that are positioned in the paths of laser output beams. In one embodiment of the invention the laser output beams are reflected from the multiplexer mirror and scanned across a series of collimating lenses before reaching the shutter assemblies. The shutter assemblies include portions that can be selectively adjusted into or out of the paths of the output beams to allow all or a portion of each of the output beams to pass through apertures in the shutter assemblies before reaching additional downstream optics that direct and focus the output beams onto the paper to produce holes in the paper.

In an embodiment of the invention, the array of optics used to control the laser beam that burns holes in the paper or other flexible web material includes adjustable optics such as an adjustable beam expander or an adjustable beam concentrator, which are placed in the path of the laser beam before the laser beam is reflected and divided by the multiplexer mirror into a plurality of laser output beams.

The laser perforation of the paper can result in a build-up of dust on the guide rollers over which the paper is passed at very high speeds during the perforation process. In accordance with an embodiment of the present invention, this dust can be removed from the rollers through the use of doctor blades that can be selectively adjusted into contact with the rollers during the manufacturing process.

DETAILED DESCRIPTION OF EMBODIMENTS

Figure 1:
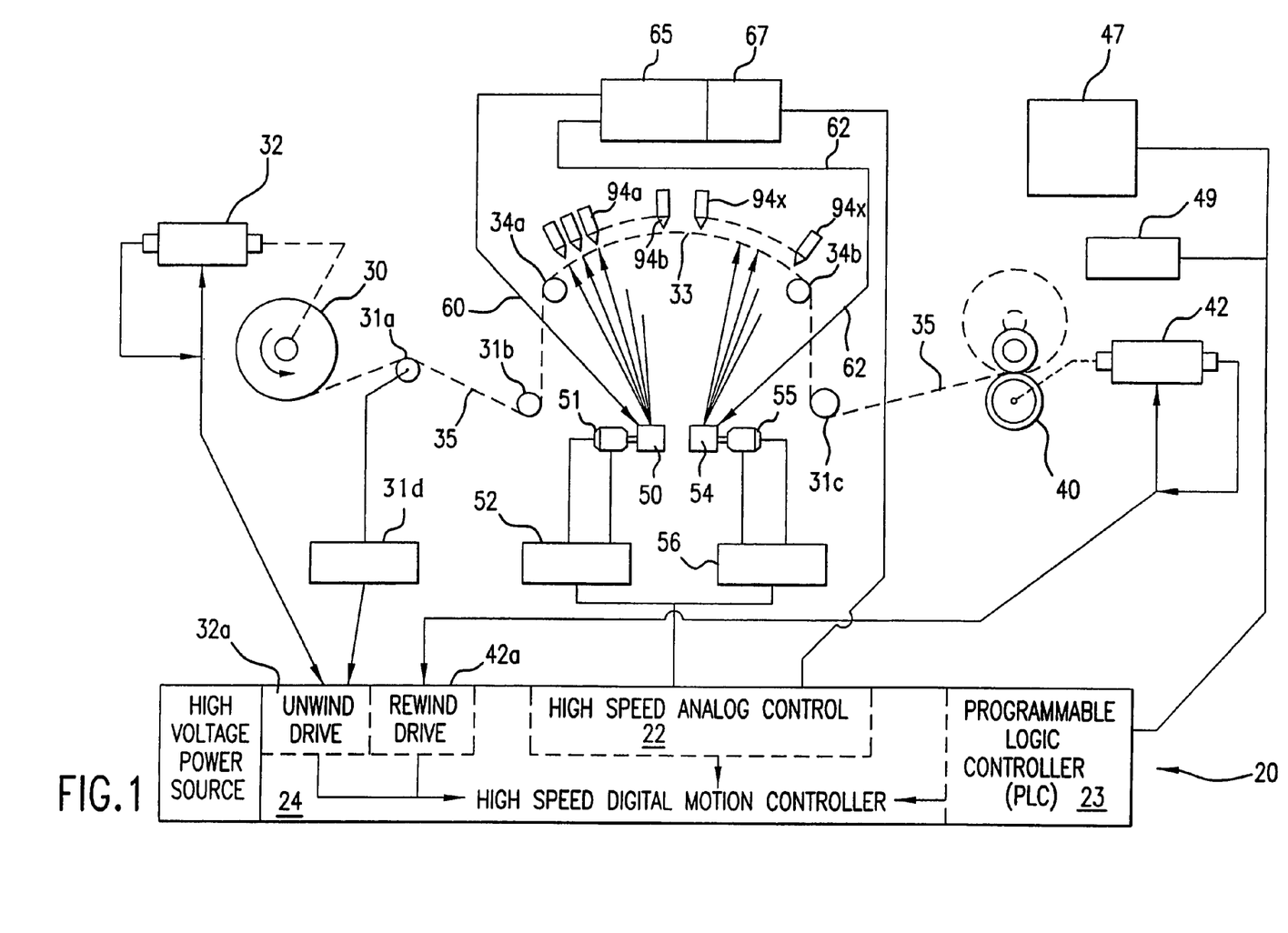
FIG. 1 shows a schematic representation of a system for controlling laser perforation of a web of paper according to an embodiment of the invention.

Referring initially to FIG. 1, a system according to an embodiment of the invention is shown for controlling the perforation process performed by a high speed cigarette tipping paper laser perforator. The embodiment of the system is shown to include two laser beam multiplexer mirrors 50, 54. The laser beam multiplexer mirrors are multi-faceted mirrors that receive focused laser beams 60, 62 from laser beam generator 65. Multiplexer mirror 50 is driven to rotate by a motor 51, and multiplexer mirror 54 is driven to rotate by a motor 55 such that the focused laser beams 60, 62 are divided into a plurality of laser output beams that are scanned across additional downstream optics before being focused to burn holes in the paper 35. The embodiment shown in FIG. 1 controls aspects of the laser perforation process, including the speed at which the paper 35 is unwound from a bobbin 30 and rewound onto a rewind bobbin 40, the frequency or rate of rotation of the laser multiplexer mirrors 50, 54, and the power intensity of the laser beams 60, 62. The controls implemented on the various components of the system shown in FIG. 1 enable laser perforation of the paper 35 consistently at very high speeds up to 1525 meters per minute or 5000 feet per minute, and throughout the total length of the paper 35.

The controls implemented by the various components of the system shown in FIG. 1 enable control of three major characteristics of a tipping paper perforation process. These characteristics include the paper web processing speeds, the number of perforated holes per inch burned into the paper, and the physical size of the holes. The process is controlled throughout the winding and rewinding of the paper web 35. By accurately controlling the process through the accelerating and decelerating of the paper web as it is unwound from one bobbin and rewound onto another bobbin, all or nearly all of the material on the finished rewound bobbin 40 is product that meets the specifications.

As shown in FIG. 1, the unwind bobbin 30 is driven by an unwind motor 32 that receives drive signals and provides feedback to an unwind drive 32a, while the rewind bobbin 40 is driven by a rewind motor 42 that receives drive signals and provides feedback signals to a rewind drive 42a. The paper web 35 passes from the unwind bobbin 30 over a tension roller 31a, and additional guide rollers 31b, 34a, 34b, and 31c, before being rewound on the rewind bobbin 40. In the embodiment of FIG. 1, a tension controller 31d is also provided to control the tension by movement of tension roller 31a.

Multiplexer drives 52, 56 send drive signals to the multiplexer drive motors 51, 55, respectively, and receive feedback from these motors. Control signals are provided to, and feedback received from these multiplexer drives 52, 56, by a high speed analog control 22, which makes up part of a control unit 20. The control unit 20 further includes the unwind drive controller 32a, rewind drive controller 42a, and a high speed digital motion controller 24 that receives signals from and sends signals to the unwind drive controller 32a, rewind drive controller 42a, and a programmable logic controller 23. The programmable logic controller 23 also receives signals from various machine controls 49 as well as control signals from an operator interface 47.

The high speed digital motion controller 24 develops the acceleration/constant velocity/deceleration profiles for the rewind motor 42 and unwind motor 32. This motor system controls the speed at which paper web 35 is driven from standstill to full speed and then back to standstill. One or both of the motors 32, 42 are provided with precise position encoders that provide feedback signals to the high speed digital motion controller 24 through the unwind drive 32a and rewind drive 42a. The drive signals generated by this high speed digital motion controller 24 are then fed back through the drive controllers 32a, 42a to the motion control system including unwind motor 32 and rewind motor 42. The precise position encoders provide actual speed and position data back to the drive system for precise control of the web speed. From this signal an actual speed reference is developed internally to the drive system.

In the system shown in FIG. 1, two independent multiplexer mirrors 50, 54 are utilized to divide the incoming laser beams 60, 62 into multiple output beams. The rotational speed of the multiplexer mirrors 50, 54 and the speed of the paper web 35 dictates the actual number of perforated holes per inch that will be burned into the paper web by focusing lenses. A typical number of holes per inch used when producing the tipping paper for manufacture of cigarettes can fall within the range from 10 holes per inch to 115 holes per inch.

In an embodiment of the invention, a rewind actual speed reference signal as determined by the high speed digital motion controller 24 is used to develop the actual speed command for both multiplexer mirrors 50, 54. As an example, the multiplexer motors 51, 55 may have a minimum speed of 100 revolutions per second or hertz, and a maximum speed of 1100 hertz in an application wherein holes are perforated in cigarette tipping paper. In this example, during normal operation when no paper is being processed, the multiplexer mirrors are driven by the multiplexer motors to revolve at 100 hertz. As the process starts, the rate of travel of the paper being unwound from unwind bobbin 30 and rewound onto rewind bobbin 40 is accelerated at a linear rate.

Switchover speed is the point where the multiplexer base speed of 100 hertz and the paper web speed result in the desired number of holes per inch. When this switchover speed is reached, individual laser beam shutter assemblies, which will be described in more detail below, are open and allow the multiple laser output beams to perforate the moving web 35. As the process continues, the paper web 35 is accelerated to its maximum speed by controlling the rates at which the unwind bobbin 30 and the rewind bobbin 40 are rotated, and the frequency of rotation of both multiplexer mirrors 50, 54 is also accelerated to match the speed of the paper until the maximum constant velocity is reached. Since the paper is generally accelerated at a linear rate, the rate at which the multiplexer mirrors 50, 54 are rotated is also increased at a linear rate to match the acceleration of the paper. As the process nears completion, the paper web is then decelerated, with the multiplexer frequencies also being decelerated at the same rate as the paper until the 100 hertz switchover speed is reached. At the 100 hertz switchover speed, the shutter assemblies are again closed and the paper continues to slow to a standstill while the multiplexer mirrors rotate at 100 hertz.

In an embodiment of the invention, the rewind actual speed reference signal determined by the high speed digital motion controller 24 is used to develop the power signals sent by high speed analog control 22 to the laser controls 67, which control laser beam generator 65, and produce output laser beams 60, 62. The outputs of laser beams 60, 62 are controlled independently from each other. A 0 to 10 volt analog signal from the high speed analog control 22 commands power for the lasers from a minimum to a maximum amount of power. In an application developed for perforating cigarette tipping paper such as in the embodiment shown in FIG. 1, a 0 volt analog signal from the high speed analog control 22 commands 0 watts of power at the laser beam generator 65, while a 10 volt analog signal from the high speed analog control 22 commands 1800 watts of power at the laser beam generator 65. In normal operation when no paper is being processed, the laser power is commanded at approximately 500 watts. This power setting keeps the internal laser optics and power monitoring components within laser control 67 at a stable temperature. This minimizes any power overshoot as the laser power is ramped to as high as 1800 watts. Power overshoot that could result if the internal laser optics and power monitoring components were not maintained at a stable temperature could result in variation in the hole size perforated by focusing lenses 94a, 94b . . . 94x, as shown in FIG. 1, through the paper web 35.

When the process for perforating the paper web 35 is started, and the paper web 35 is ready to be accelerated, the laser power command signal is dropped to the required value for producing the correctly sized holes at the switchover speed set point, i.e. the speed where the process begins to perforate the paper. This power setting is normally less than 50 watts. Even though the paper web 35 is accelerated at a linear rate from standstill to full speed, the laser power command signal must be controlled based on a complex quadratic equation taking into account the actual speed of the paper as monitored and controlled by the high speed digital motion controller 24. The resulting laser control signals sent to laser control 67 determine the amount of power supplied to the laser beam generator 65 for controlling output laser beams 60, 62. The control of the laser power based upon a complex quadratic equation is required as a result of variables that include, but are not limited to, the responsiveness of the laser beam generator 65 and the offset between commanded power and actual power produced at the laser beam generator.

As the paper web 35 is decelerated, the laser power is controlled until the web speed drops below the switchover point. At the switchover point the paper is no longer perforated and the paper web is almost stopped. Once the web is at a standstill, the laser power is commanded back to its standstill power level of 500 watts until the process is restarted. The minimum and maximum power values provided to the lasers are a variable of the process and the specification of the product that is being processed. Parameters such as paper basis weight, process speed, permeability of the paper as measured in CORESTA units, and the number of holes per inch, all factor into determining the desired laser power settings.

The optics that are provided in the paths of laser beams 60, 62 allow for additional control of the perforating process. The paper processing speed and the speed at which the multiplexer mirrors 50, 54 are rotated dictates the number of holes per inch that each burn-head or final focusing lens 94a, 94b . . . 94x can perforate. The laser power that reaches the final focusing lenses controls the size of the holes that are created during the perforation process. Significant benefits can be realized if the number of burn-heads or focusing lenses used is limited. The paper speed of the process and the number of holes per inch can be increased when fewer burn-heads are used. Additional optics that can be positioned downstream of the multiplexer mirror to further control the laser perforating process are illustrated in FIGS. 2 and 3A-3E, and additional optics that can be placed upstream of the multiplexer mirror are illustrated in FIG. 4.

Figure 2:
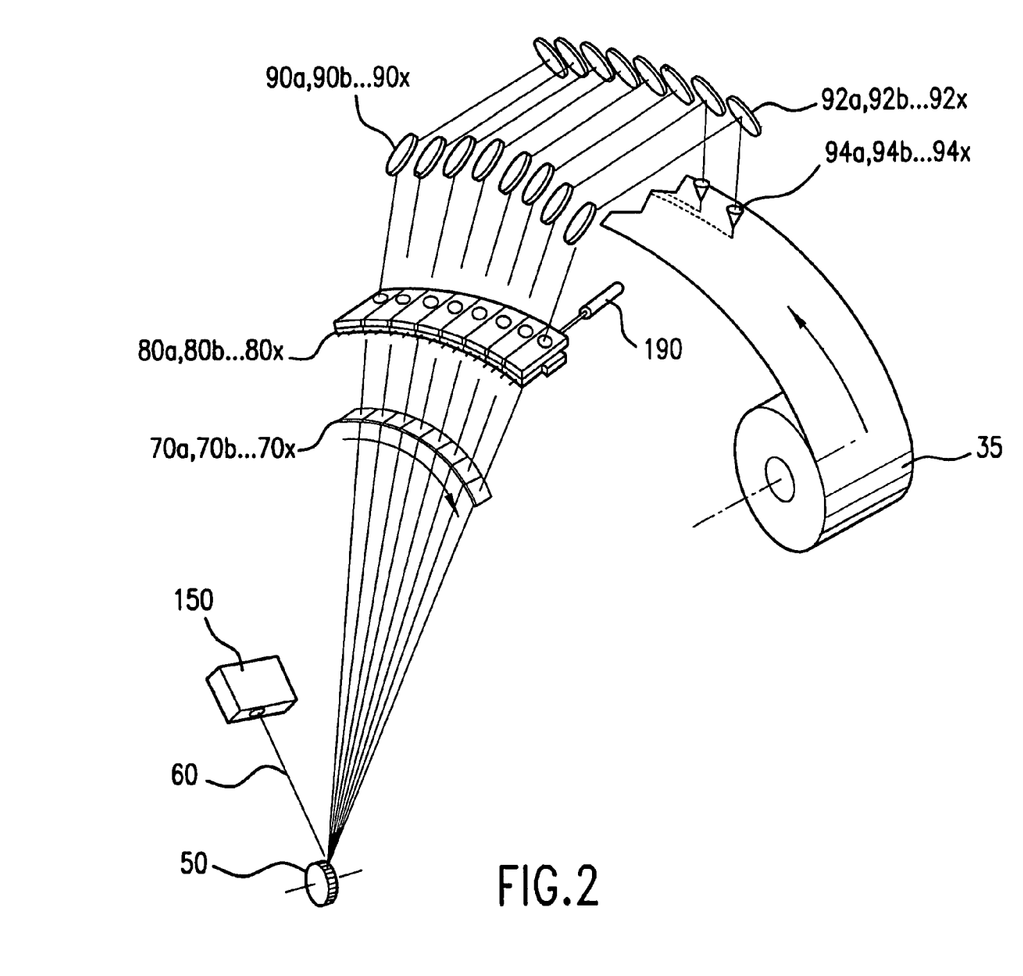
FIG. 2 shows an array of optics used to control a laser beam used to perforate paper according to an embodiment of the invention.

Referring to FIG. 2, a high-powered laser beam, such as the laser beam generated by a PRC 3000 watt fast flow/D mode $CO_2$ laser (PRC Corporation, Landing, N.J.), is focused by an optical lens 150 onto the multiplexer mirror 50 such as shown in FIGS. 1 and 2. Each facet of the multiplexer mirror 50 creates a repeating arc of the laser radiation as the mirror rotates. The reflected laser beam sweeps across a series of collimating lenses 70a, 70b . . . 70x.

Multiplexing systems such as the Baasel Multiplexer System (Rofm Baasel Laser Tech, Munich, Germany) can multiplex or divide the incoming laser beam into a minimum of four laser output beams to a maximum of sixteen laser output beams. The number of facets on the multiplexer mirror 50 controls this process. The period of time that each collimating lens 70a, 70b . . . 70x is exposed to the laser radiation is significantly affected when different numbers of laser output beams are created. As an example, if the multiplexer mirror 50 creates an arc of laser radiation that covers only four collimating lenses, the effect is that twenty-five percent of the scan period is spent on one collimating lens. However, if the multiplexer mirror 50 creates an arc that covers 16 collimating lenses, the effect is that 6.25 percent of the scan period is spent on one collimating lens. A greater number of facets on the multiplexer mirror 50 at the same rotational speed for the mirror 50 results in a reduced period of time that the laser output beam is focused by the final focusing lenses 94a, 94b . . . 94x. The difference in scan period, and therefore the amount of time that the output beam is focused, has an impact on the shape of the holes that are vaporized in the moving paper web 35.

In accordance with an embodiment of the invention as shown in FIGS. 2 and 3A-3E, shutter assemblies 80a, 80b, . . . 80x are positioned downstream from the collimating lenses 70a, 70b . . . 70x such that the laser output beams pass through individual shutter assemblies before entering the final acceptance section including bending mirrors 90a, 90b . . . 90x, and 92a, 92b . . . 92x, and before passing through final focusing lenses or burn heads 94a, 94b . . . 94x to perforate holes in the paper web 35.

Figure 3A:
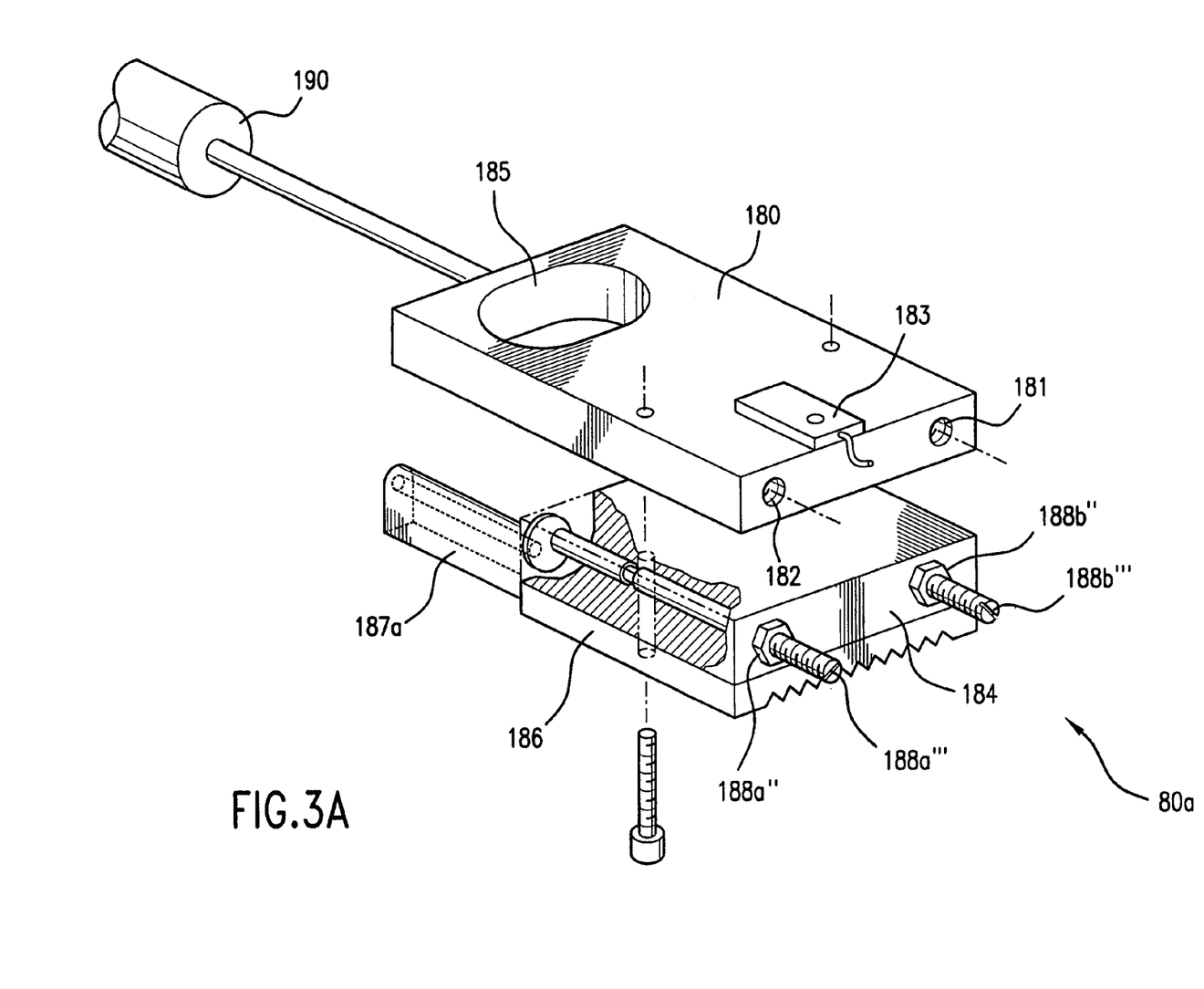
FIG. 3A illustrates a shutter assembly according to an embodiment of the invention.
Figure 4:
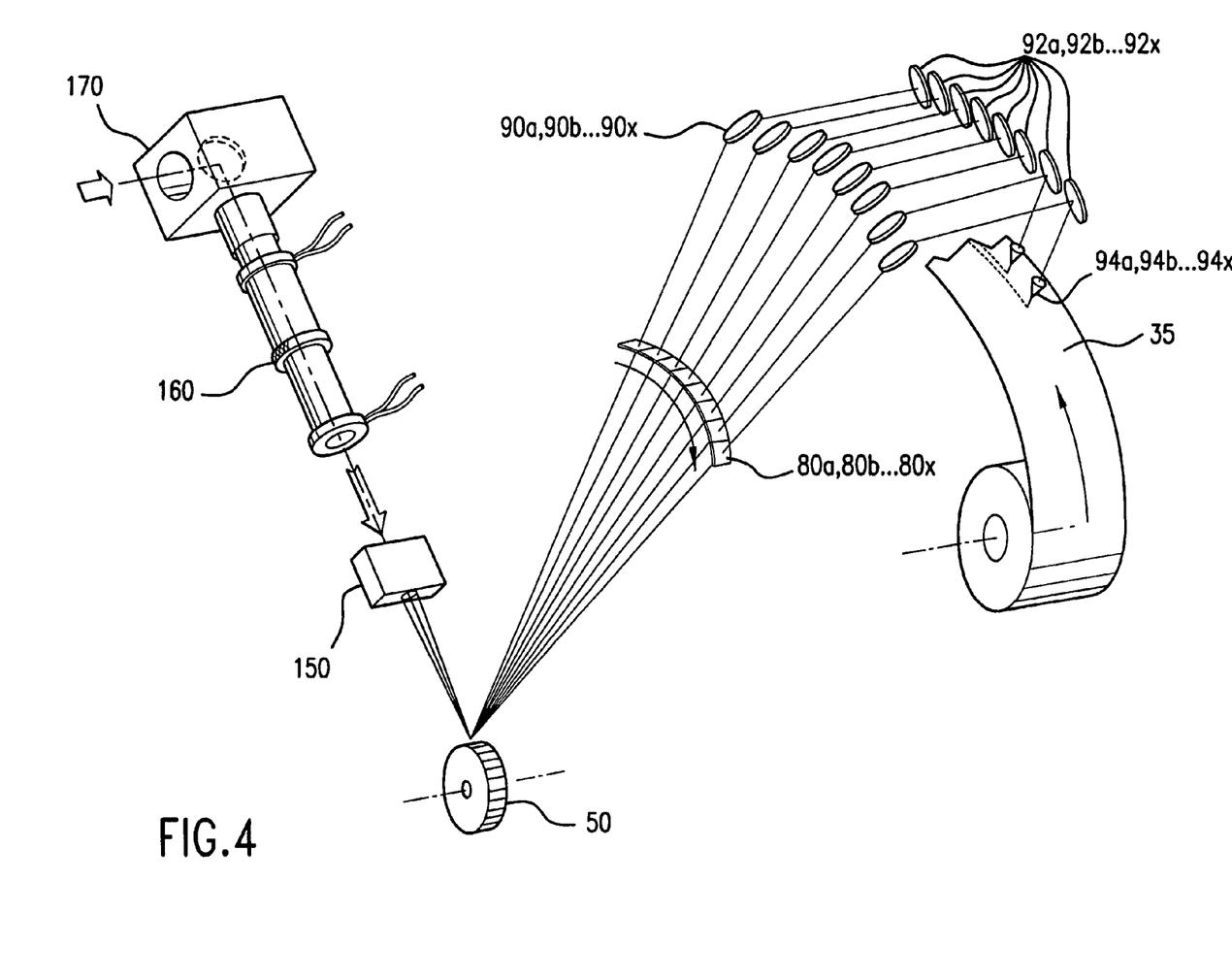
FIG. 4 illustrates an array of optics used to control a laser beam used to perforate paper according to an embodiment of the invention.

The shutter assemblies 80a, 80b . . . 80x are actuated by air cylinders such as air cylinder 190, shown in FIG. 2, such that they either completely block the laser output beams from multiplexer mirror 50 and collimating lenses 70a, 70b . . . 70x, or are moved to a position wherein apertures 185 of the shutter assemblies, shown in FIG. 3A, are aligned with the laser output beams and allow them to pass. Alternative arrangements for moving the shutter assemblies could include stepper motors, hydraulic actuators or other known actuation devices. When the shutter assemblies are moved by air cylinders 190 such that the apertures 185 are not aligned with the laser output beams, the laser output beams are absorbed by carbon blocks 186 attached to the opposite ends of the shutter assemblies from the apertures 185. The energy absorbed by the carbon blocks 186 is transferred to an aluminum heat sink 184 and aluminum plate 180, with the aluminum plate 180 being provided with cooling passages 181, 182 in order to dissipate the heat absorbed from the laser output beam. A temperature sensor 183 is attached to the aluminum plate 180 of the shutter assembly, as shown in FIG. 3A, to ensure that cooling fluid is being pumped through the cooling passageways 181, 182 in order to cool the aluminum plate. The temperature sensor 183 monitors the temperature of the shutter assembly, and shuts down the laser perforation process if the temperatures get too high.

The programmable logic controller 23, shown in FIG. 1, controls operation of the air cylinders 190 and thereby moves the shutter assemblies between a position wherein the apertures 185 are aligned with laser output beams and a position wherein the laser output beams are completely absorbed by carbon blocks 186.

Figure 3B:
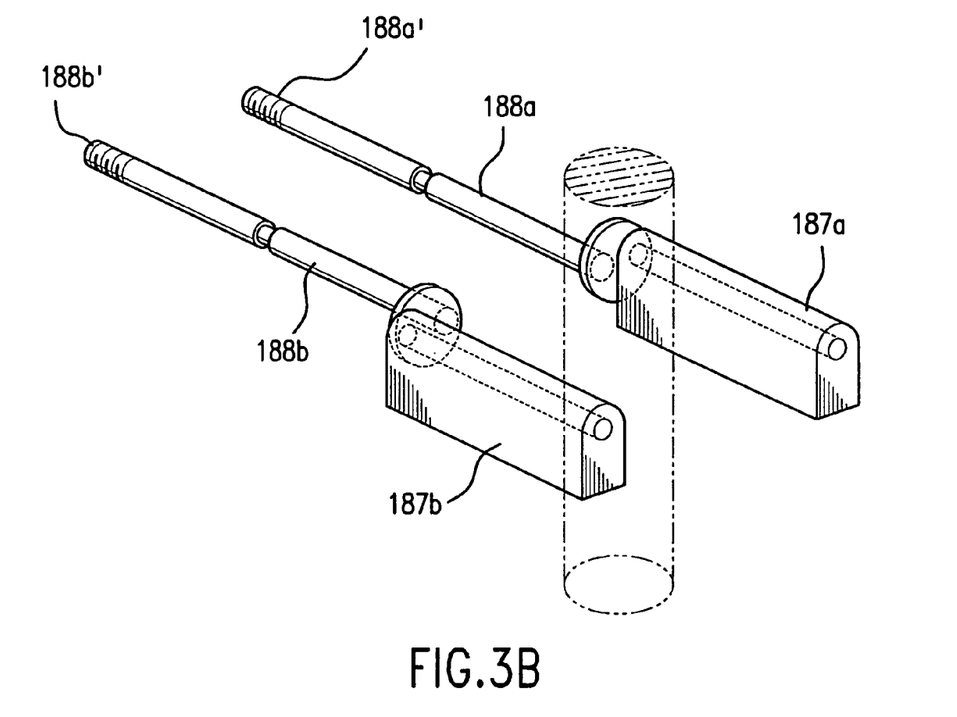
FIG. 3B illustrates details of the shutter assembly shown in FIG. 3A.
Figure 3C:
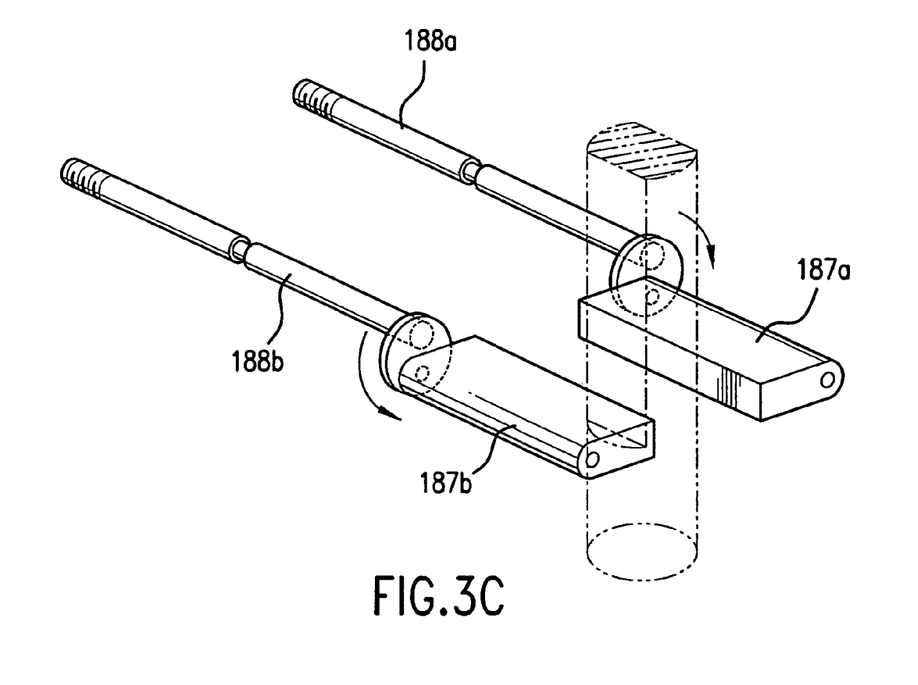
FIG. 3C illustrates details of the shutter assembly shown in FIG. 3B.

As shown in FIGS. 3A-3E, an embodiment of the invention includes two holes drilled through the aluminum heat sink 184 positioned between the carbon block 186 and the top plate 180 of the shutter assemblies, with two eccentric shafts 188a and 188b installed through these two holes in the aluminum heat sink 84. The two eccentric shafts 188a and 188b have off-centered rods that extend from the side of aluminum heat sink 184 toward aperture 185 and support carbon tabs 187a and 187b, as shown in FIGS. 3B and 3C. The eccentric shafts 188a, 188b are rotated to a desired position and locked in place by locknuts 188a'' and 188b''. The locknuts 188a'' and 188b'' are threaded over threaded ends of the eccentric shafts 188a and 188b, with the threaded ends of the eccentric shafts also being provided with slots 188a''' and 188b''' that facilitate adjustment of the position of the eccentric shafts such as when the shafts are too hot to be handled manually.

Figure 3D:
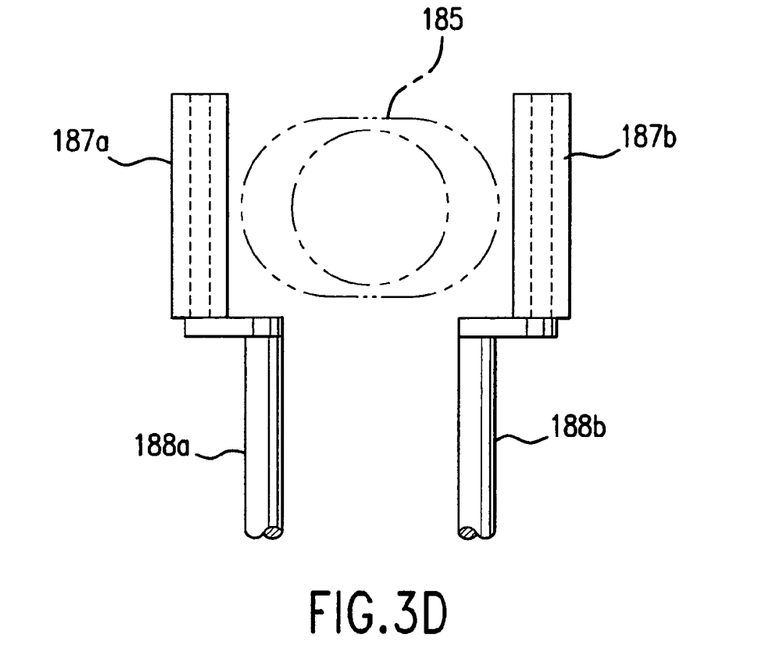
FIG. 3D illustrates a plan view of the details shown in FIG. 3B.
Figure 3E:
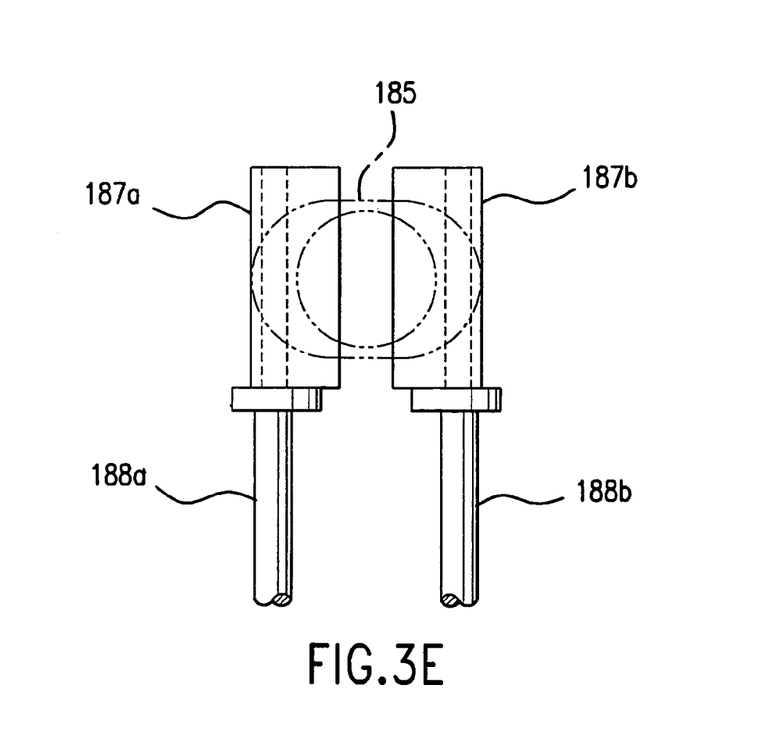
FIG. 3E illustrates a plan view of the details shown in FIG. 3C.

In the position shown in FIG. 3D, the eccentric shafts 188a, 188b have been rotated to a position wherein the carbon tabs 187a, 187b do not block any of the aperture 185, and therefore maximize the period of time that an output beam being scanned across the shutter assembly by rotation of multiplexer mirror 50 will be able to pass through the aperture 185 for downstream focusing and perforation of paper 35. In the position shown in FIG. 3E, the eccentric shafts 188a and 188b have been rotated to a position wherein carbon tabs 187a and 187b block at least a portion of apertures 185, thereby reducing the period of time that the laser output beam will be able to pass through aperture 185 in the shutter assembly for downstream focusing and perforation of holes in the paper 35. In the positions shown in FIGS. 3C and 3E, wherein carbon tabs 187a, 187b partially block the aperture 185, the amount of laser energy that reaches the final focusing lenses for perforation of the paper 35 is reduced from the amount of energy that is available when apertures 185 of shutter assemblies 80a, 80b . . . 80x remain completely open, as shown in FIGS. 3B and 3D.

The shutter assemblies shown in FIGS. 3A-3E enable production of at least a substantially identical product on perforating machines that use different numbers of burn-heads or final focusing lenses, since adjustment of the carbon tabs 187a, 187b such as discussed above allows the duty cycle or period of time that laser energy is available for focusing by the final focus lenses to remain constant regardless of how many burn-heads are scanned by laser output beams from the multiplexer mirror. As an example, a multiplexer mirror with fewer facets creates an arc of laser radiation wherein a larger percentage of the total scan period is spent on one collimating lens than would be the case for a multiplexer mirror with a greater number of facets. In this case, the carbon tabs on the associated shutter assemblies could be adjusted to partially close the apertures 185 in the shutter assemblies such that the period of time laser radiation is actually provided to the final focusing lenses remains the same as would be the case for a multiplexer mirror having the greater number of facets.

In the embodiment of the invention shown in FIG. 4, additional optics can be provided upstream of the multiplexer mirror in order to control the amount of laser radiation that reaches the final focusing lenses, and hence control the hole size and shape that is burned into the paper web 35. Control of the size of the laser beam being provided to the multiplexer mirror as shown in FIG. 4 can be used to match the power density and mode of the laser beam to the system of lenses and mirrors that are provided downstream from the multiplexer mirror 50.

In the embodiment shown in FIG. 4, a high-powered laser beam, such as one that could be generated by a PRC 3000 watt fast flow/D mode CO2 laser (PRC Corporation, Landing, N.J.), enters the system through a tube or from a bending mirror assembly 170. Either a beam expander or a beam concentrator 160 is positioned downstream from the bending mirror assembly 170, with the beam expander/concentrator being adjustable to allow a user to select a degree of concentration or enlargement of the incoming laser radiation. Depending on the requirements, a user may enlarge the beam diameter to completely fill the lens 150, or may choose to reduce the beam diameter. The lens 150 then focuses the desired sized laser radiation onto the multiplexer mirror 50, which is rotating at a very high speed. The rotating multiplexer mirror 50 reflects and divides the laser beam to create a scanning array of laser output beams that are passed through collimating lenses 80a, 80b . . . 80x, reflected by bending mirrors 90a, 90b . . . 90x and 92a, 92b . . . 92x, and focused by final focusing lenses 94a, 94b . . . 94x to produce holes in the paper web 35.

The arrangement shown in FIG. 4 allows matching of the incoming laser beam diameter to a particular array of optics including a multiplexer mirror, and other downstream mirrors and lenses. As an example, a given laser generator may be capable of producing three different types of laser beams. Beam number 1 may be a 00-mode beam with 1200 watts of power and a 14 mm beam diameter. Beam number 2 may be a D-mode beam with 1700 watts of power and an 18 mm beam diameter. Beam number 3 may be a Q-mode beam with 2100 watts of power and a 24 mm beam diameter. To effectively use one of the three different beam profiles, the optical multiplexing assembly including the multiplexer mirror 50 and the downstream collimating lenses, bending mirrors and focusing lenses could be fitted with a different selection of parts depending on which one of the three different beam profiles was desired. The selection of parts would ensure that the incoming beam matches the optical components following the collimating lenses.

In the embodiment shown in FIG. 4, however, a simple adjustment of the beam expander/concentrator 160 upstream of the multiplexer mirror 50 results in a laser beam of the desired dimensions to match the optical characteristics of the existing system. With this embodiment the optical system components do not have to be changed to accommodate different beam profiles, and therefore no further alignment is required. The arrangement shown in FIG. 4 also provides the ability to fine-tune the size of the laser radiation exiting the beam expander in order to control the final focal spot size. This is accomplished, for example, by making small adjustments to the overall length of the beam expander. This technique impacts the hole size and shape burned into the paper web 35. Alignment of the downstream optics is not changed by adjustments made at the beam expander/concentrator 160, and therefore potentially dangerous alignment procedures using the laser beam are not required each time the size of the incoming laser beam is changed.

During the process of perforating paper 35 using laser beams that have been focused by focusing lenses 94a, 94b . . . 94x, in a burn table region 33, as shown in FIG. 1, the web of paper 35 is pulled across a series of rollers and the web is under high tension. These rollers 31a, 31b, 34a, 34b, and 31c, as shown in FIG. 1, ensure that the paper web 35 remains stable during the burning process and at an optimal focal distance from the focusing lenses. As a result of the vaporizing of paper that occurs when the laser beams are focused on the paper web 35, ultra-small holes are formed in the paper 35. If the paper web 35 moves even the slightest amount during this process, and thereby changes the focal distance between the focusing lenses and the paper in the burn table region 33, the size and shape of the holes being burned in the paper would change. This change in hole size will effect the permeability of the paper.

The perforation process creates a dust residue that is molten hot and sticky. Because the rollers supporting the paper web 35 are extremely close in proximity to the point where the laser beams burn the holes in the paper, dust residue naturally builds up on the rollers. The linear speed of the paper can carry and drive this dust into the downstream rollers. Taking into account that up to 40,000 holes per second per laser focusing lens can be burned in the moving paper web, the amount of dust build-up can make the product being perforated unacceptable in less than one minute if the dust is allowed to build up on the rollers. Other build-up on the rollers resulting from printing inks etc. can also cause the same problem by affecting the focal distance from the moving paper web 35 to the focusing lenses.

Figure 5A:
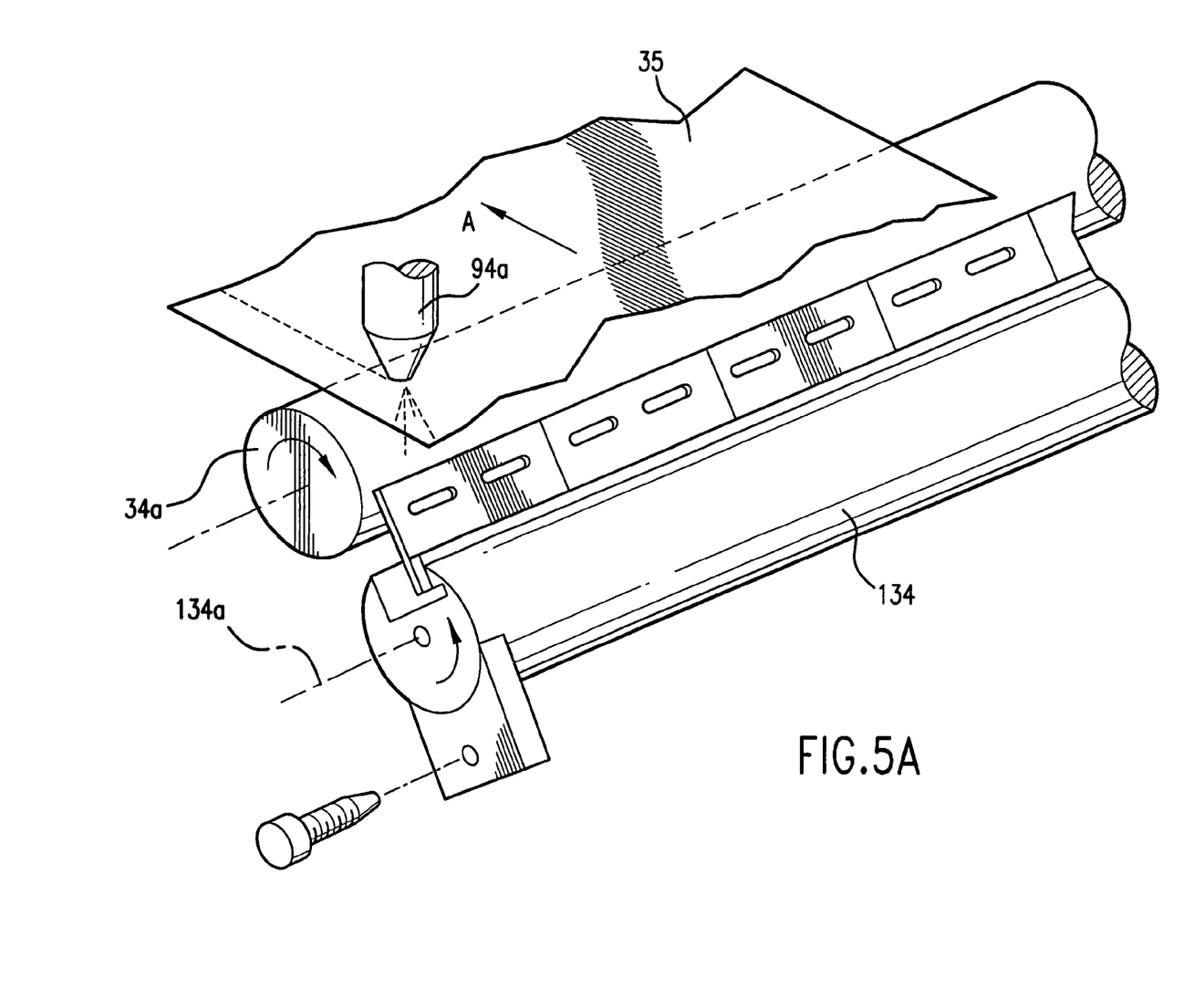
FIG. 5A illustrates an arrangement for removing residue from a roller used to guide paper during a laser perforation process.
Figure 5B:
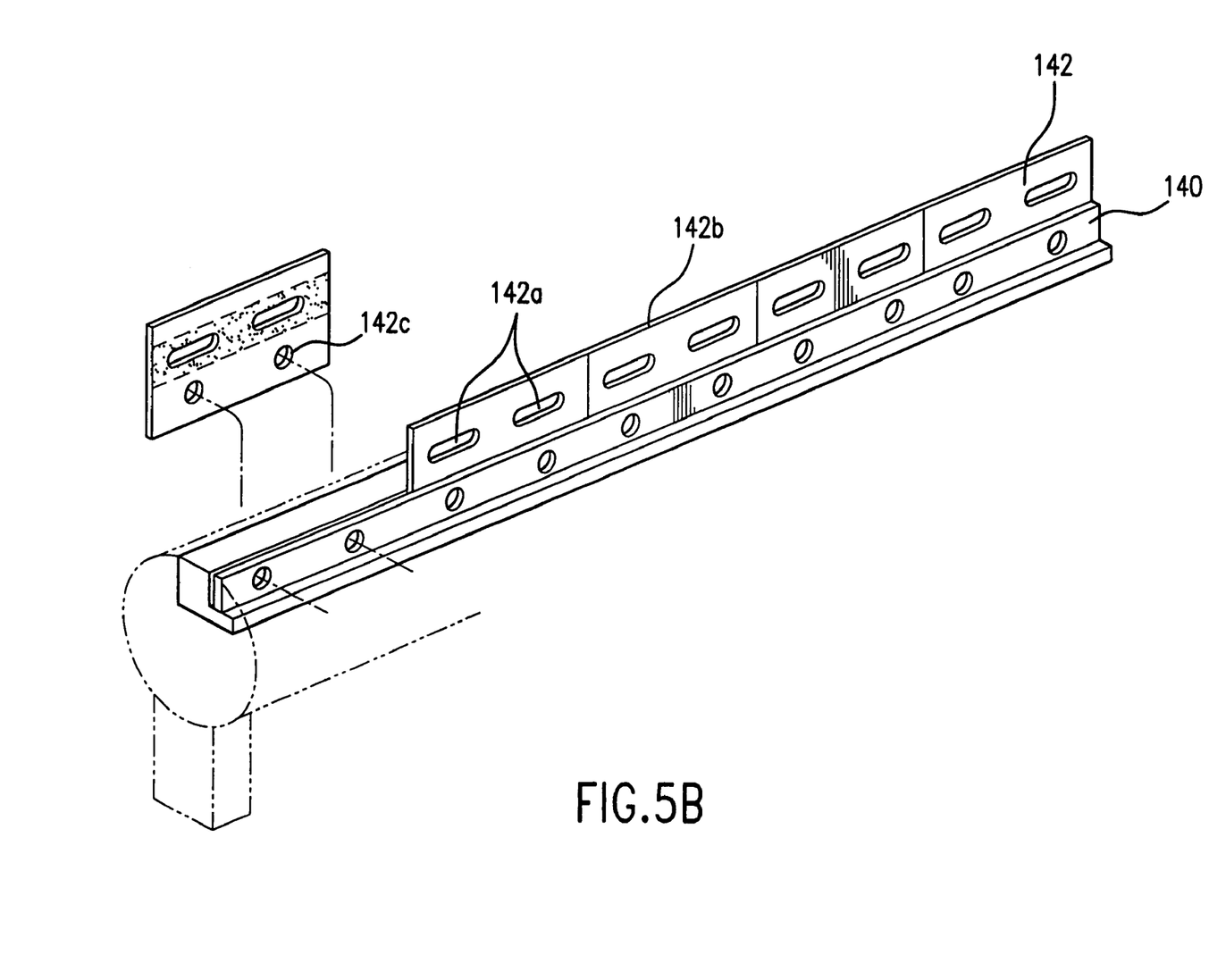
FIG. 5B illustrates details of the arrangement shown in FIG. 5A.

In order to minimize the build-up of dust or other residue on the rollers that may affect the size and shape of the holes burned in the moving paper web 35, the embodiment of the invention illustrated in FIGS. 5A and 5B provides an arrangement for removing any build-up from the rollers during the perforation process. As shown in FIG. 5A, the paper web 35 is moved in a direction A over a roller 34*a* in the burn table region 33 (shown in FIG. 1.) The paper web 35 travels at very high speeds, e.g., 83 feet per second, and is under extremely high tension as a result of the tension controller 31*b* and roller 31*a* shown in FIG. 1. As the paper web 35 travels in the direction A, output laser beams are focused by focusing lenses 94*a*, 94*b* ... 94*x* (94*a* being shown in FIG. 5A) with up to 110 holes per linear inch of travel per burn head or focusing lens being possible according to an embodiment of the invention.

As shown in FIG. 5A, the roller 34*a* is downstream from the focusing lens 94*a* in the direction of travel A of paper web 35, and is accordingly bombarded with molten dust created by the laser perforation process.

The rollers such as roller 34*a* shown in FIG. 5A are manufactured to an extremely tight outside diameter-tolerance, then carbide coated and precisely ground. As shown in FIG. 5A, roller 34*a* is driven in a counterclockwise direction relative to the travel of paper web 35, and thereby carries dust away from the tangent point where the paper 35 rests on the roller 34*a*. As the roller 34*a* rotates, a stationary doctor blade(s) 142 scrapes dust build-up from the roller. In the embodiment shown in FIG. 5B, the doctor blade is assembled from five individual blades 142 that are arranged in end-to-end relationship along a doctor blade cartridge 140. Because each blade 142 works independently, each blade 142 contacts a smaller area on the roller 134*a*. In an embodiment of the invention, the individual blades 142 are manufactured from high-grade tool steel, and after grinding they are heat treated by a quench and temper heat treatment in order to make the blades very hard (e.g. over 60 Rockwell). Because the tempering process makes the blades very brittle, two slots 142*a* are formed in the center of each of blades 142. These slots minimize the load that the blades develop when they are in contact with the roller 34*a*. To further alleviate any tendency for the blades 142.*to* break as a result of their hardness, engagement pressure against the roller, and reduced material in the slot areas 142*a*, the blades 142 are annealed in the region of the slots 142*a*.

As shown in FIG. 5A, the blade cartridge 140 and blades 142 are mounted on a pivoting holder 134 that can be driven to rotate about an axis 134*a* to bring the sharp edges 142*b* of the blades 142 into contact with roller 34*a*. The entire assembly is positioned so that the tips 142*b* of the blades 142 are tangent to the roller 34*a*. The setup shown in FIGS. 5A and 5B enables automatic cleaning of dust or other residue build-up on the rollers during the laser perforation manufacturing process, and therefore greatly improves the productivity over what could be achieved if the process had to be stopped so that the rollers could be cleaned manually.

It is to be understood that the present invention may be embodied in other specific forms and the process of use may be varied without departing from the spirit or essential characteristics of the present invention. Thus, while the invention has been illustrated and described in accordance with various embodiments, it is recognized that variations and changes may be made therein without departing from the invention as set forth in the claims.

What is claimed is:

1. A system for controlling a process for perforating a flexible web comprising:
    a supply spindle of the flexible web, said supply spindle being mounted for powered angular rotation at variable speed;
    a take-up spindle for receiving a portion of the flexible web from the supply spindle, said take-up spindle being mounted for powered angular rotation at variable speed;
    a variable-power laser beam generator;
    at least one multi-faceted mirror positioned in the path of a laser beam emitted from said laser beam generator, said at least one multi-faceted mirror being driven by a drive unit to rotate, and said at least one rotating multi-faceted mirror dividing said laser beam into a plurality of output beams that are scanned across additional downstream optics and focused to burn a plurality of holes in said flexible web; and
    a control device including sensors and an output that controls feeding speed of the flexible web by controlling the angular rotation speed of said supply spindle and said take-up spindle, controls said drive unit to rotate said multi-faceted mirror, and varies the level of power supplied to said laser beam generator between multiple levels greater than zero, as a function of the feeding speed of the flexible web in response to sensor inputs and control output.

2. The system according to claim 1, wherein said control device comprises:
    a digital motion controller, said digital motion controller providing drive signals to and receiving feedback signals from an unwind motor and a rewind motor, said unwind motor driving said supply spindle and said rewind motor driving said take-up spindle, and
    a programmable logic controller, said programmable logic controller providing an interface for receiving signals from an operator and from other machine controls.

3. The system according to claim 2, wherein said control device further includes an analog control, said analog control providing command signals to and receiving feedback signals from said drive unit to rotate said at least one multi-faceted mirror and laser controls for said laser beam generator.

4. The system according to claim 1 further including a plurality of collimating lenses through which the respective output beams pass; and a plurality of shutter assemblies positioned in the paths of said output beams received from said collimating lenses; said shutter assemblies including shutter portions selectively adjustable between: a fully open position allowing all of the respective output beam to pass therethrough, a fully closed position allowing none of the respective output beams to pass therethrough, and a partially open position allowing only a portion of the respective output beam to pass therethrough.

5. The laser beam control system according to claim 4 wherein said shutter portions comprises carbon tabs.

6. The laser beam control system according to claim 5, wherein said shutter assemblies further include metal portions in contact with said carbon portions that are adapted to receive heat from said carbon portions and dissipate said heat through a cooling medium circulated through said metal portions.

7. The laser beam control system according to claim 6 wherein said metal portions comprises aluminum.

8. A method for perforating a flexible web comprising:
feeding said flexible web from a supply spindle of said web, across a burn table region having a plurality of laser beam focusing lenses, and onto a take-up spindle;
directing a laser beam onto a rotating, multi-faceted mirror such that said laser beam is divided into a plurality of laser output beams that are scanned across downstream optics that control and direct said laser output beams before said laser output beams are focused by said focusing lenses to burn holes in said flexible web,
varying feeding speed of the flexible web, and
varying level of power of the laser beam between multiple levels greater than zero, and varying rotation speed of the multi-faceted mirror as a function of variances in the feeding speed of the flexible web such that a predetermined number of holes per inch is burned in said flexible web.

9. The method according to claim 8, wherein said holes are burned in said flexible web at a variable rate within the range from 10 holes per inch of said flexible web to 115 holes per inch of said flexible web.

10. The method according to claim 8, further including passing the output beams through respective collimating lenses and thereafter through respective shutter assemblies, and selectively adjusting each of the shutter assemblies to different positions as a function of the number of output beams.

* * * * *